(12) United States Patent
Landreneau

(10) Patent No.: US 12,361,604 B1
(45) Date of Patent: Jul. 15, 2025

(54) EDGE BOUNDARY VISUALIZATION IMPROVEMENT

(71) Applicant: Apple Inc., Cupertino, CA (US)

(72) Inventor: Eric Landreneau, Castro Valley, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 17/867,868

(22) Filed: Jul. 19, 2022

Related U.S. Application Data

(60) Provisional application No. 63/226,224, filed on Jul. 28, 2021.

(51) Int. Cl.
*G06T 11/00* (2006.01)
*G06T 5/70* (2024.01)
*G06T 7/90* (2017.01)

(52) U.S. Cl.
CPC ............. *G06T 11/001* (2013.01); *G06T 5/70* (2024.01); *G06T 7/90* (2017.01); *G06T 2207/10024* (2013.01)

(58) Field of Classification Search
CPC . G06T 11/001; G06T 5/70; G06T 7/90; G06T 2207/10024
See application file for complete search history.

(56) References Cited

U.S. PATENT DOCUMENTS

| | | | | |
|---|---|---|---|---|
| 7,826,531 B2* | 11/2010 | Wang | ................... | H04N 19/107 375/240.1 |
| 8,476,569 B2* | 7/2013 | Konno | ................. | G02B 26/101 353/37 |
| 11,158,060 B2* | 10/2021 | Ellison | ................... | G06T 7/0002 |
| 2003/0083850 A1* | 5/2003 | Schmidt | .................. | G06T 7/001 702/189 |
| 2005/0117216 A1* | 6/2005 | Lee | ......................... | H04N 13/31 359/464 |
| 2005/0168778 A1* | 8/2005 | Abe | ........................ | G06T 11/60 358/1.18 |
| 2008/0316209 A1* | 12/2008 | Wen | ......................... | A61C 7/00 345/419 |
| 2013/0050192 A1* | 2/2013 | Kira | ..................... | G06F 16/5838 345/419 |

(Continued)

OTHER PUBLICATIONS

Reiner et al, "Dual color mixing for Fused Deposit Modeling Printers", 2014, John Wiley & Sons Ltd (Year: 2014).*

(Continued)

*Primary Examiner* — YuJang Tswei
(74) *Attorney, Agent, or Firm* — Thompson Hine LLP

(57) ABSTRACT

Various implementations disclosed herein include devices, systems, and methods that improve edge boundary visualization. In some implementations, this involves reducing the appearance of banding that might otherwise be visible by altering the appearance of a pattern that has a gradual change in color, e.g., the appearance of edges between the gradual changes in blues in the sky. In contrast to prior techniques that use random isotropic (any direction) dithering to avoid banding, this method uses an an-isotropic (different in one direction than another) interleaved pattern. For example, the pattern may have an alternating pattern that interleaves adjacent colors in a particular arrangement, such as using a fine-toothed comb-type pattern.

19 Claims, 4 Drawing Sheets

(56) References Cited

U.S. PATENT DOCUMENTS

| | | | | |
|---|---|---|---|---|
| 2015/0062115 | A1* | 3/2015 | Asente | G06T 11/203 |
| | | | | 345/419 |
| 2017/0228867 | A1* | 8/2017 | Baruch | G06T 7/12 |
| 2020/0026922 | A1* | 1/2020 | Pekelny | G06V 20/20 |
| 2021/0140763 | A1* | 5/2021 | Pesach | A61B 1/0605 |
| 2022/0198185 | A1* | 6/2022 | Prebble | G06T 11/20 |

OTHER PUBLICATIONS

Giannatsis et al, "Fabrication of Graded Structures by Extrusion 3D Printing", 2015, IEEE (Year: 2015).*
Savage, How to Resolve Color Banding in Your Images—Savage—Apr. 13, 2020 (Year: 2020).*
Zou et al—Recognition of overlapping elliptical objects in a binary image—May 2021—Springer (Year: 2021).*
"Advances in Real-Time Rendering in Games Course"; Vancour Siggraph 2014; The 41st International Conference and Exhibition on Computer Graphics and Interactive Techniques; pp. 1-12.

* cited by examiner

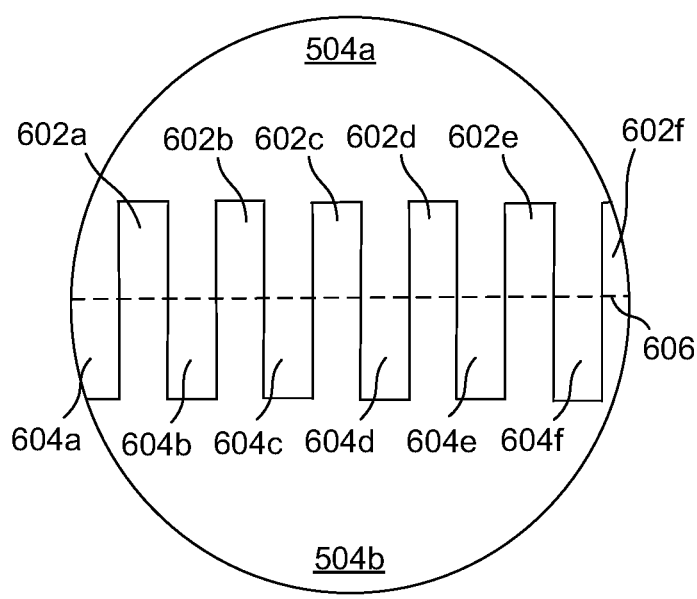 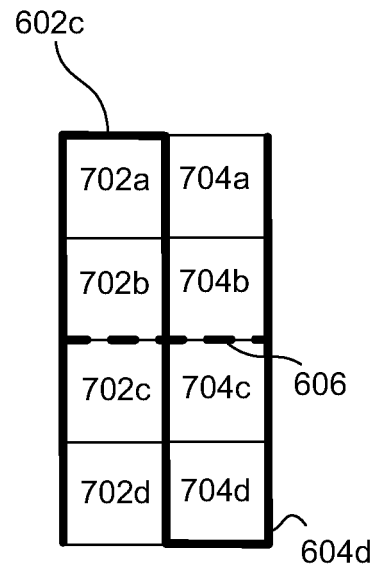
FIG. 6    FIG. 7
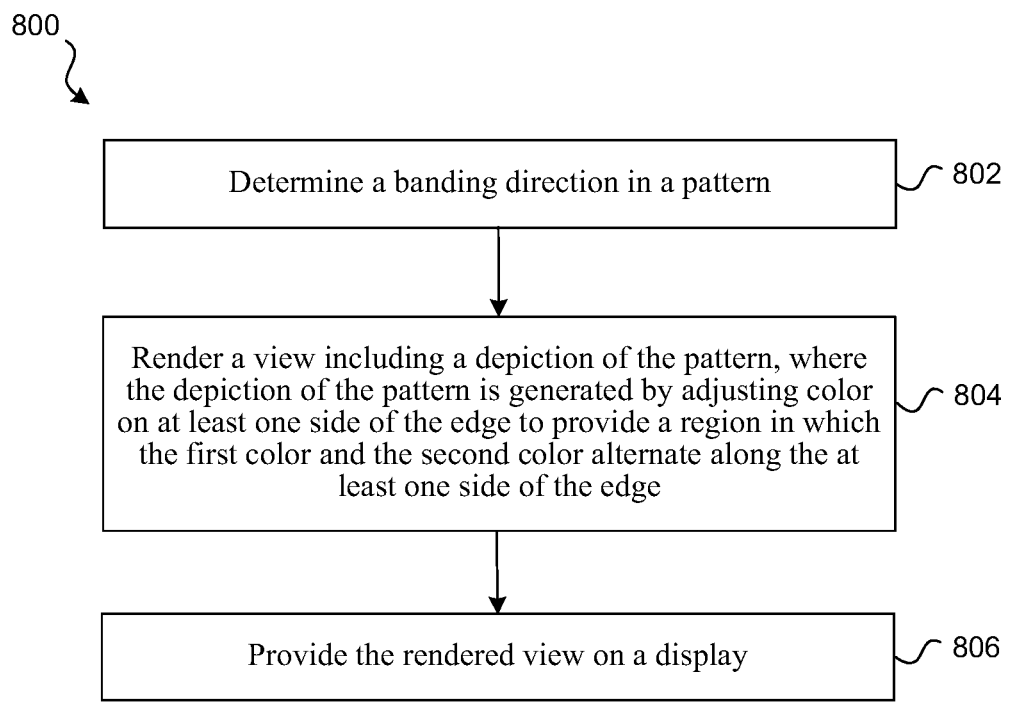
FIG. 8

EDGE BOUNDARY VISUALIZATION IMPROVEMENT

CROSS-REFERENCE TO RELATED APPLICATIONS

This application claims the benefit of U.S. Provisional Application Ser. No. 63/226,224 filed Jul. 28, 2021, which is incorporated herein in its entirety.

TECHNICAL FIELD

The present disclosure generally relates to electronic devices that provide views of content, including views that include representations of real and/or virtual content that includes textures or other patterns of gradual color change in which banding artifacts (i.e., the appearance of edges between gradual color changes) are undesirable.

BACKGROUND

The displays of various electronic devices produce images using a number of different colors. For example, an 8-bit RGB system may provide 256 colors for each color channel. The number of colors available, while relatively large, is not infinite. The limited number of available colors may result, in certain circumstances, in banding artifacts in which the transition between gradual color changes appear to be visible edges rather than providing an appearance of a continuous and gradual color transition. Existing systems use dithering approaches that attempt to address banding artifacts by adding noise to make edges less noticeable.

SUMMARY

Various implementations disclosed herein include devices, systems, and methods that improve edge boundary visualization, for example, by reducing the appearance of banding and providing smooth color transitions. In some implementations, this involves reducing the appearance of banding that might otherwise be visible by altering the appearance of a pattern that has a gradual change in color, e.g., the appearance of edges between the gradual changes in shades of blue in the sky. In contrast to prior techniques that use random isotropic (any direction) dithering to avoid banding, some of the methods disclosed uses an an-isotropic (different in one direction than another) interleaved pattern. For example, an interleaved pattern may be produced that has alternating regions that interleave adjacent colors in a particular arrangement, such as using a fine-toothed comb-type pattern. The method may be performed at render time, e.g., by a GPU shader, while producing a view given a particular viewpoint. A specific use case provides views that include a sky defined by a sky dome pattern with reduced or no banding. The method may be particularly useful on HMDs that provide an immersive display that is enclosed around the user's eyes that may otherwise make banding more noticeable.

In some implementations, a processor performs a method by executing instructions stored on a computer readable medium. The method determines a banding direction in a pattern, where the pattern exhibits a gradual change in a color characteristic in the banding direction, the pattern including an edge between a first band of a first color and a second band of a second color. The gradual change may be a change in lightness, hue, value, saturation, or any other characteristic that may be gradually changed to provide a gradual change in appearance in which edges between changes are not intended to be visually distinct. In some implementations, the method determines a banding direction based on identifying a gradual change in one direction and not in the orthogonal direction. For example, a texture may be analyzed in a plurality of directions to identify whether there is a gradual change in any of those directions to identify a banding direction. The banding direction may be determined prior to rendering or at the time of rendering.

The exemplary method renders a view (e.g., determining pixel values for display) including a depiction of the pattern, where the depiction of the pattern is generated by adjusting color on at least one side of the edge to provide a region in which the first color and the second color alternate along the at least one side of the edge. This may involve interleaving the colors on one or both sides of the edge. The pattern may have a 3D geometry (e.g., a sky dome texture) that is used in generating a view of a 3D environment. In some implementations, interleaved portions (e.g., the teeth of the comb-type pattern) may have a width of a fixed number of pixels (e.g., one pixel) and a length that is determined based on band size (e.g., spanning more pixels for larger bands). For example, the view may be generated based on approximating the angle that a single color grade change would occur over, e.g., gradient occurs between X and Y radians and has Z discrete levels, such that the size of a single band would be |X-Y|/Z radians, which may be used to determine the length of the interleaved portions, e.g., the teeth of the comb-type pattern. The width of the interleaved portions (e.g., the teeth of the comb-type pattern) may be proportional to the solid angle size, in radians, of a single pixel such that the method provides interleaving that alternates every pixel. The method provides the rendered view on a display.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 illustrates a portion of the interleaving of FIG. 5.

FIG. 7 illustrates pixels interleaved according to the interleaving illustrated in FIGS. 5 and 6 in accordance with some implementations.

FIG. 8 is a flowchart illustrating a method for improving edge boundary visualization in accordance with some implementations.

Figure 1:
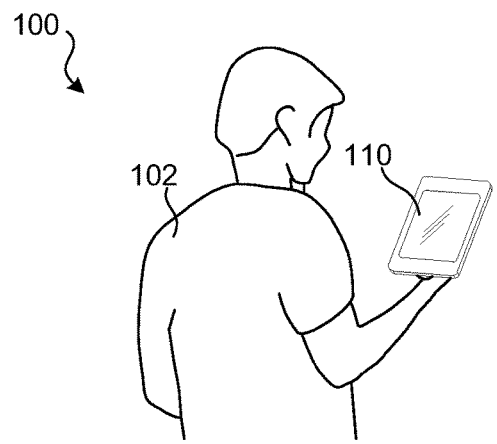
FIG. 1 illustrates exemplary an electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 110 operating in a physical environment 100. The electronic device 110 may include one or more cameras, microphones, depth sensors, or other sensors that can be used to capture information about and evaluate the physical environment 100 and the objects within it, as well as information about the user 102 of the electronic device 110. The information about the physical environment 100 and/or user 102 may be used to provide visual and audio content and/or to identify the current location of the physical environment 100 and/or the location of the user within the physical environment 100. In some implementations, views of an extended reality (XR) environment may be provided to one or more participants (e.g., user 102 and/or other participants not shown). Such an XR environment may include views of a 3D environment that is generated based on camera images and/or depth camera images of the physical environment 100 as well as a representation of user 102 based on camera images and/or depth camera images of the user 102. Such an XR environment may include virtual content.

A physical environment refers to a physical world that people can sense and/or interact with without aid of electronic systems. The physical environment may include physical features such as a physical surface or a physical object. For example, the physical environment corresponds to a physical park that includes physical trees, physical buildings, and physical people. People can directly sense and/or interact with the physical environment, such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to characteristic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
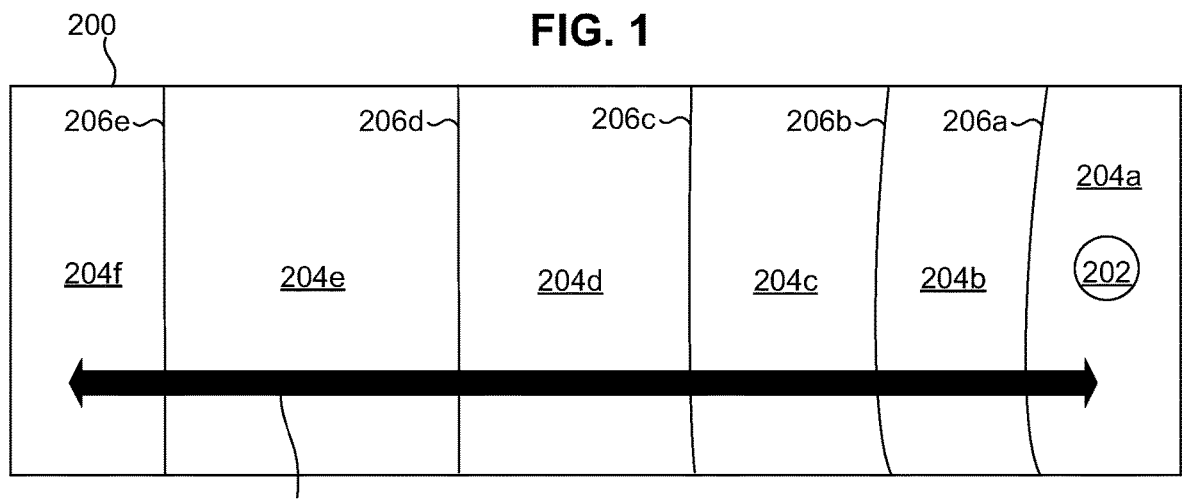
FIG. 2 illustrates a banding direction in a pattern.

FIG. 2 illustrates a banding direction in a pattern 200. In this example, the pattern includes a depiction of the sun 202 and regions 204a-f of gradually changing sky color, i.e., blue colors that become progressively darker from region 204a to region 204f. The regions 204a-f are separated from one another at edges 206a-e. Specifically, region 204a is separated from region 204b at edge 206a, region 204b is separated from region 204c at edge 206b, region 204c is separated from region 204d at edge 206c, region 204d is separated from region 204e at edge 206d, and region 204e is separated from region 204f at edge 206e. The edges 206a-e are generally straight. In some patterns, edges between regions will have a curved or other non-linear shape. For example, edges 206a-c are curved in this example. In some implementations, a direction of banding 208 is determined manually or automatically. For example, a color gradient direction may be automatically determined based on identifying one or more edges 206a-e between regions 204a-f in a pattern 200. Such a direction, for example, may be identified by identifying a direction that is perpendicular to one or more edge directions and/or to an average edge direction. In some implementations a separate banding direction is determined for each edge and/or for different portions along a single edge. In the case of non-linear edges, such edges may be associated with an edge direction based on the direction between a starting and ending point along the edge, within a segment of an edge that is relatively straight, or otherwise.

Figure 3:
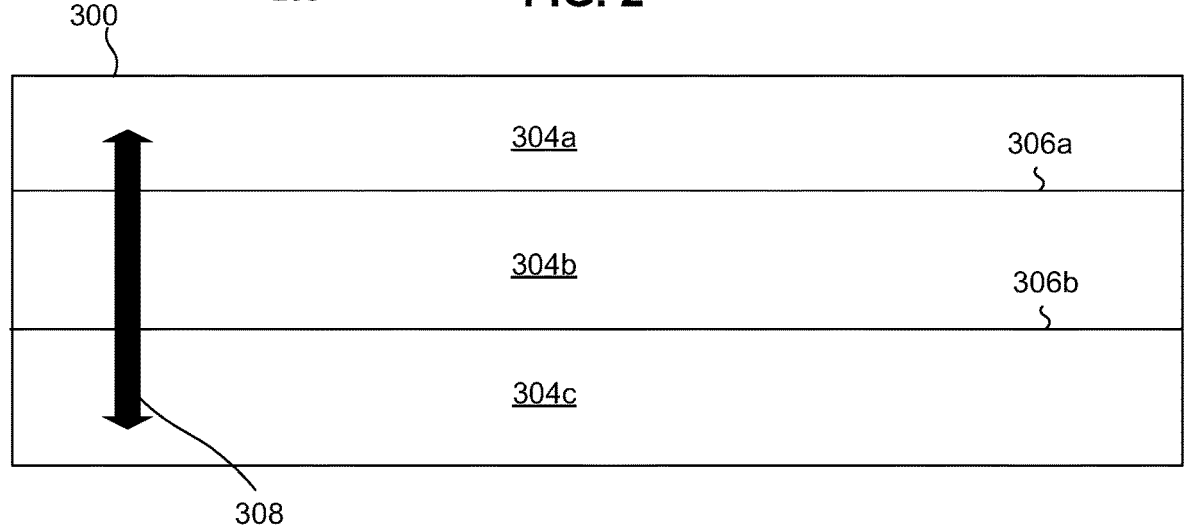
FIG. 3 illustrates a banding direction in another pattern.

FIG. 3 illustrates a banding direction in another pattern. In this example, the pattern includes regions 304a-c of gradually changing color, i.e., blue colors that become progressively lighter from region 304a to region 304c. The regions 304a-c are separated from one another at edges 306a-b. Specifically, region 304a is separated from region 304b at edge 306a and region 304b is separated from region 304c at edge 306b. In some implementations, a direction of banding 308 is determined manually or automatically. For example, a color gradient direction may be automatically determined based on identifying one or more edges 306a-b between regions 304a-c in a pattern 300. In some implementations a separate banding direction is determined for each edge and/or for different portions along a single edge.

Figure 4:
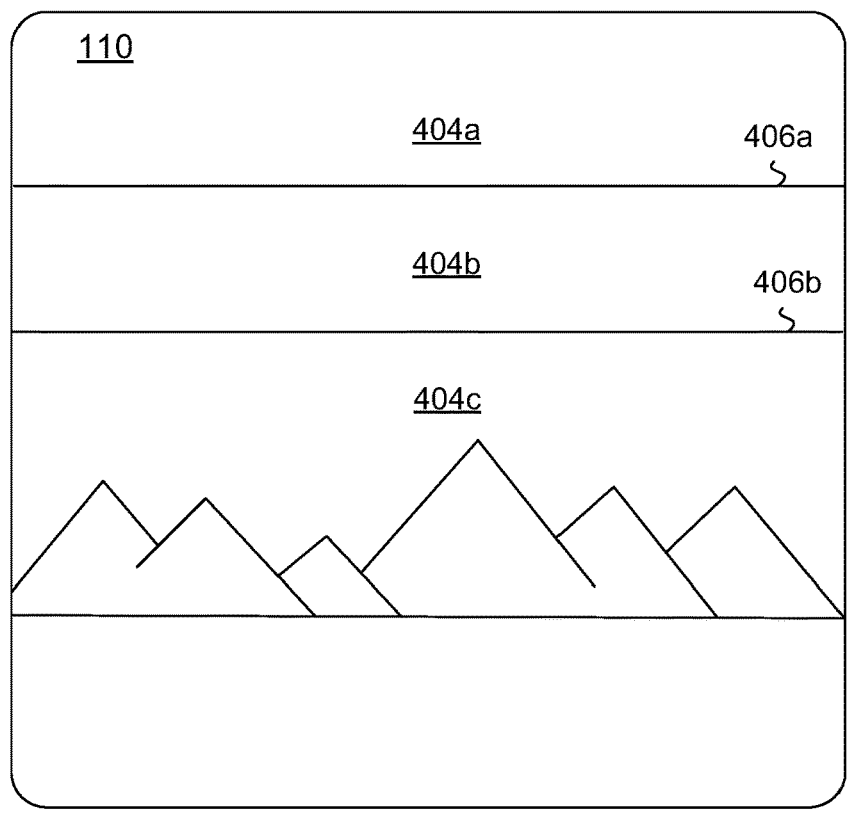
FIG. 4 illustrates banding occurring based on use of the pattern of FIG. 3 in a providing a view of content.

FIG. 4 illustrates banding occurring based on use of the pattern of FIG. 3 in providing a view of content. In this example, a view is generated on device 110 (FIG. 1) that is at least partially based on the pattern of FIG. 3. The view includes portion 404a based on region 304a, portion 404b based on region 304b, and region 404c based on region 304c, i.e., the colors of these portions 404a-c are based on the colors of the regions 304a-c. Unfortunately, this may result in noticeable banding, i.e., visible edges, appearing along edges 406a-b.

Figure 5:
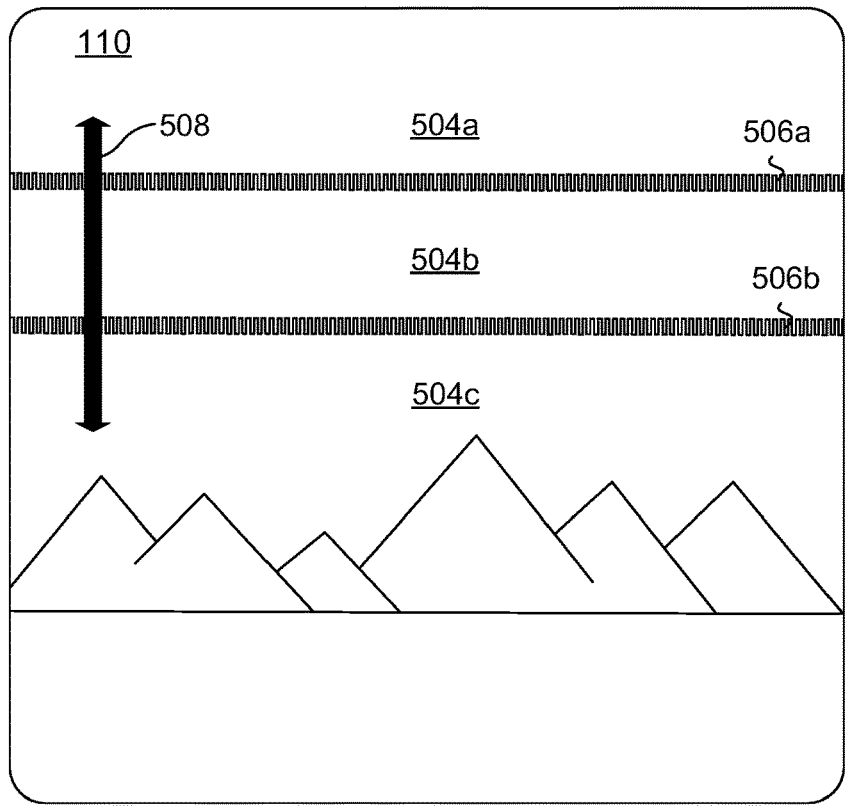
FIG. 5 illustrates the use of interleaving to reduce the banding occurring based on use of the pattern of FIG. 3 in a providing the view of content in accordance with some implementations.

FIG. 5 illustrates the use of interleaving to reduce the banding occurring based on use of the pattern of FIG. 3 in a providing the view of content in accordance with some implementations. In this example, a view is generated on device 110 (FIG. 1) that is at least partially based on the pattern of FIG. 3. The view includes portion 504a based on region 304a, portion 504b based on region 304b, and region 504c based on region 304c, i.e., the colors of these portions 504a-c are based on the colors of the regions 304a-c. However, portions 504a-c are adjusted to interleave the colors of these regions 504a-c in edge regions 506a-b to reduce the appearance of banding that might otherwise appear, as illustrated in FIG. 4.

FIG. 6 illustrates a portion of the interleaving of FIG. 5. Rather than providing a straight edge boundary between region 504a and region 504b (e.g., along straight line 606), there is an interleaved pattern in which region 504a extends into regions 604a-f and region 504b extends into regions 602a-f.

FIG. 7 illustrates pixels providing interleaving according to the interleaving illustrated in FIGS. 5 and 6 in accordance with some implementations. In this example, region 602c includes pixels 702a-d (a single pixel wide and 4 pixels long and crossing over straight line boundary 606) and region 604d includes pixels 704a-d (a single pixel wide and 4 pixels long and also cross over straight line boundary 606). The interleaving illustrated in FIG. 5-7 may provide an appearance that avoids or reduces the appearance of banding.

In some implementations, as illustrated in FIG. 5-7, a pattern is rendered in a way that blends or mixes colors around the edges between color bands, e.g., by stretching the patterns on each side of the edge into each other like the teeth of a fine-toothed comb. This may provide a better visual result that otherwise. This may provide a better visual result that prior dithering techniques, for example, by avoiding the appearance of graininess that might otherwise appear. In contrast, the techniques provided herein may reduce the appearance of banding while also providing a smooth/non-grainy appearance. The techniques may be particularly useful when providing views of patterns in dimly lit environments or views of patterns, such as sky patterns, intended to show a subtle gradient of colors based on a light source, e.g., colors appearing brighter towards the horizon.

Unlike existing dithering techniques which tend to make isotropic changes (i.e., changes that are evenly distributed in any direction/orientation), some implementations disclosed herein make changes that are an-isotropic, i.e., changes that are directionally oriented and thus different in one direction than another. The changes may be orthogonal to a determined banding direction. For example, a pattern may be stretched and creates the fine-toothed comb-type pattern (as illustrated in FIG. 5-7), a wavy pattern, a sine wave pattern, a stitching pattern, etc. based on a direction of banding. Instead of dithering using a 2D noise pattern, directional smearing or other changes are applied. Such adjustments may be thought of as applying a 1D effect that is not necessarily random.

In some implementations, a pattern includes a gradient that is represented by parameters, e.g., a gradient may be defined parametrically based on a direction of curvature, an amount of color change over space/color change derivative, etc. In some implementations, a pattern is generated and/or analyzed (to identify banding, banding direction, etc.) at the same time that a view is provided that includes the pattern. In other implementations, a pattern is generated and/or analyzed prior to be used to provide a view.

In some implementations, a view is provided that changes a pattern based on an established direction, e.g., a gradient direction or banding direction, where colors are changed or shifted on one or both sides of the an edge between bands based on the established direction. For example, colors may be shifted on either side of an edge to create an interleaving pattern.

In some implementations, a pattern is defined via a 3D representation such as a sky sphere (or partial sphere) or cube map (or partial cube map) that depicts 5 different colors of blue changing throughout a sky at 4 transition or edges.

The amount of change to such a pattern used to provide a view that avoids or reduces banding may be based on angle (since the pattern is 3D). For example, the angle associated with a band may be used to determine the amount of change, e.g., the length of the teeth of a fine-toothed comb-type pattern. In some implementations, an approximate angle of a single color grade change occurs over is determined, i.e., determining that a gradient occurs between X radians and Y radians and encompasses Z discrete levels, so the size of a single change is |X-Y|/Z radians. Such an angle may be used to determine the length of the teeth of the comb. The amount of change may also depend upon the view and the display. For example, the frequency of the change (e.g., the width of the teeth of a fine-toothed comb-type pattern) may be based the display, for example, to match the width to one pixel width on the display. For example, the width of the teeth of the comb may be proportional to the solid angle size, in radians, of a single pixel such that pattern alternating at every pixel is provided.

FIG. 8 is a flowchart illustrating a method 800 for method for improving edge boundary visualization. In some implementations, a device such as electronic device 110 performs method 800. In some implementations, method 800 is performed on a mobile device, desktop, laptop, HMD, ear-mounted device or server device. The method 800 is performed by processing logic, including hardware, firmware, software, or a combination thereof. In some implementations, the method 800 is performed on a processor executing code stored in a non-transitory computer-readable medium (e.g., a memory).

At block 802, the method 800 determines a banding direction in a pattern. The pattern may exhibit a gradual change in a color characteristic in the banding direction and may including an edge between a first band of a first color and a second band of a second color. The change in the color characteristic may be a gradual change in lightness, hue, value, saturation, or other color characteristic. The banding direction may be determined based on identifying a gradual change in one direction and not in the orthogonal direction. The banding direction may be determined prior to rendering or at the time of rendering.

At block 804, the method 800 renders a view (e.g., determining pixel values for display) including a depiction of the pattern, where the depiction of the pattern is generated by adjusting color on at least one side of the edge to provide a region in which the first color and the second color alternate along the at least one side of the edge. This may involve interleaving the colors on one or both sides of the edge. Interleaved portions may have a width of a fixed number of display pixels (e.g., one pixel) and a length based on band size as described herein. For example, where the pattern is stretched to produce a fine-toothed comb type pattern, the interleaved portion has teeth portions, the teeth portions may each have a width of one pixel and/or a length determined based on band size, e.g., the sizes of a specific band, bands, or an average size of multiple bands.

The pattern may have a 3D geometry (e.g., a sky dome) that is used in generating a view of a 3D environment. The view may be generated based on approximating the angle that a single color grade change would occur over, e.g., gradient occurs between X and Y radians and has Z discrete levels, so the size of a single band would be |X-Y|/Z radians, which may be used to determines the length of the teeth of the fine-toothed comb type pattern. The width of the teeth may be proportional to the solid angle size, in radians, of a single pixel such that the method provides interleaving that alternates every pixel.

At block 806, the method 800 provides the rendered view on a display. The view may be a view of a 3D environment generated based on a viewpoint, the pattern, and/or additional content. The display may be any type of display including, but not limited to, flat displays, displays of mobile devices, displays of tablet devices, displays of head-mounted devices, displays of desktop computing devices, displays of television devices, displays of billboard type devices, etc.

Figure 9:
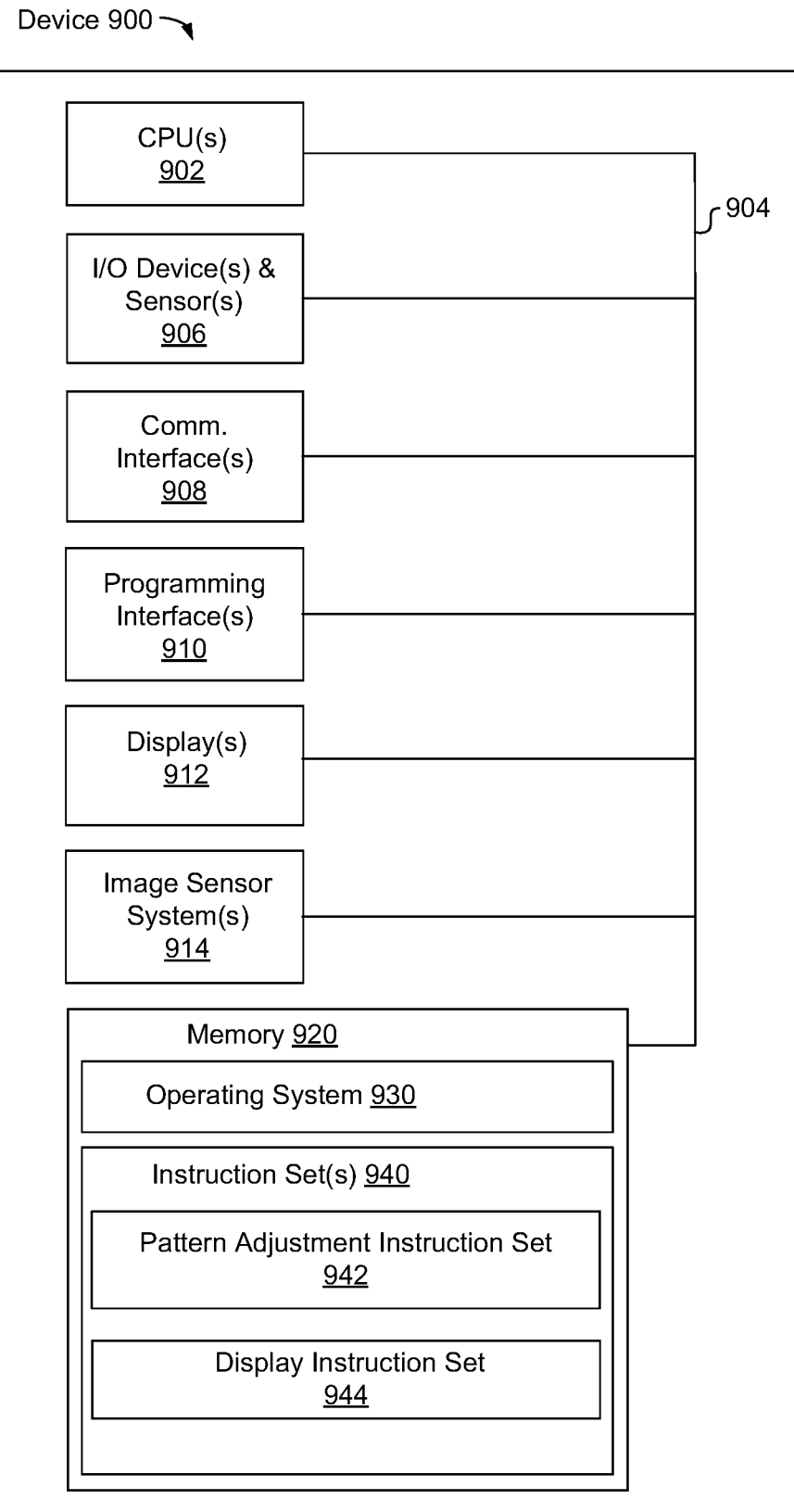
FIG. 9 is a block diagram of an electronic device of in accordance with some implementations.

FIG. 9 is a block diagram of electronic device 900. Device 900 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 910, one or more output device(s) 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 912 include one or more displays configured to present a view of a 3D environment to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 900 includes a single display. In another example, the device 900 includes a display for each eye of the user.

In some implementations, the one or more output device(s) 912 include one or more audio producing devices. In some implementations, the one or more output device(s) 912 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 912 may additionally or alternatively be configured to generate haptics.

In some implementations, the one or more image sensor systems 914 are configured to obtain image data that corresponds to at least a portion of a physical environment. For example, the one or more image sensor systems 914 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include a pattern adjustment instruction set 942 configured to, upon execution, adjust a pattern for rendering a view as described herein. The instruction set(s) 940 further include a display instruction set 946 configured to, upon execution, display views of physical environments and XR environments as described herein. The instruction set(s) 940 may be embodied as a single software executable or multiple software executables.

Although the instruction set(s) 940 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device having a processor:
      determining a banding direction in a pattern, wherein the pattern exhibits a gradual change in a color characteristic in the banding direction, the pattern including an edge between a first band of a first color and a second band of a second color;
      identifying the edge in the pattern;
      rendering a view including a depiction of the pattern, wherein the depiction of the pattern is generated, based on identifying the edge, by adjusting color to replace at least a portion of the edge with a region in which the first color and the second color alternate to form an interleaved portion along where the edge was and having teeth portions, each of the teeth portions having a width of one or more pixels and each of the teeth portions having a length determined based on approximating an angle over which a color grade occurs; and
      providing the rendered view on a display.

2. The method of claim 1, wherein adjusting color comprises interleaving the first color and the second color to form the interleaved portion along at least one side of where the edge was.

3. The method of claim 1, wherein adjusting color comprises interleaving the first color and the second color on both sides of where the edge was to form the interleaved portion.

4. The method of claim 1, wherein the pattern has a 3D geometry and the view is generated by providing a view of the 3D geometry based on a viewpoint.

5. The method of claim 1, further comprising determining the angle based on radians over which a gradient occurs and a number of bands in the gradient.

6. The method of claim 1, wherein the teeth portions each have a width that is proportional to an angle of a single pixel.

7. The method of claim 1, wherein the color characteristic comprises hue, saturation, value, or lightness.

8. The method of claim 1 further comprising determining the banding direction based on identifying that a gradual change in the color characteristic occurs in the banding direction and that no change in the color characteristic occurs in a second direction that is orthogonal to the banding direction.

9. The method of claim 1, wherein the banding direction is determined prior to the rendering.

10. The method of claim 1, wherein the banding direction is determined as part of the rendering.

11. A method comprising:
    at a device having a processor:
       determining a banding direction in a pattern, wherein the pattern exhibits a gradual change in a color characteristic in the banding direction, the pattern including an edge between a first band of a first color and a second band of a second color;
       identifying the edge in the pattern;
       rendering a view including a depiction of the pattern, wherein the depiction of the pattern is generated, based on identifying the edge, by adjusting color to replace at least a portion of the edge with a region in which the first color and the second color alternate to form an interleaved portion along where the edge was and having teeth portions, the teeth portions each having a width of one pixel; and
       providing the rendered view on a display.

12. A method comprising:
    at a device having a processor:
       determining a banding direction in a pattern, wherein the pattern exhibits a gradual change in a color characteristic in the banding direction, the pattern including an edge between a first band of a first color and a second band of a second color;
       identifying the edge in the pattern;
       rendering a view including a depiction of the pattern, wherein the depiction of the pattern is generated, based on identifying the edge, by adjusting color to replace at least a portion of the edge with a region in which the first color and the second color alternate to form an interleaved portion along where the edge was and having teeth portions, each of the teeth portions having a width of one or more pixels and the teeth portions each having a length determined based on a band size; and
       providing the rendered view on a display.

13. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:
       determining a banding direction in a pattern, wherein the pattern exhibits a gradual change in a color characteristic in the banding direction, the pattern including an edge between a first band of a first color and a second band of a second color;
       identifying the edge in the pattern;
       rendering a view including a depiction of the pattern, wherein the depiction of the pattern is generated, based on identifying the edge, by adjusting color to replace at least a portion of the edge with a region in which the first color and the second color alternate to form an interleaved portion along where the edge was and having teeth portions, each of the teeth portions having a width of one or more pixels and each of the teeth portions having a length determined based on approximating an angle over which a color grade occurs; and
providing the rendered view on a display.

14. The system of claim 13, wherein adjusting color comprises interleaving the first color and the second color to form the interleaved portion along at least one side of where the edge was.

15. The system of claim 13, wherein adjusting color comprises interleaving the first color and the second color on both sides of where the edge was to form the interleaved portion.

16. The system of claim 13, wherein the pattern has a 3D geometry and the view is generated by providing a view of the 3D geometry based on a viewpoint.

17. The system of claim 13, wherein the method further comprises determining the angle based on radians over which a gradient occurs and a number of bands in the gradient.

18. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
determining a banding direction in a pattern, wherein the pattern exhibits a gradual change in a color characteristic in the banding direction, the pattern including an edge between a first band of a first color and a second band of a second color;
identifying the edge in the pattern;
rendering a view including a depiction of the pattern, wherein the depiction of the pattern is generated, based on identifying the edge, by adjusting color to replace at least a portion of the edge with a region in which the first color and the second color alternate to form an interleaved portion along where the edge was and having teeth portions, the teeth portions each having a width of one pixel and a length determined based on a band size; and
providing the rendered view on a display.

19. A non-transitory computer-readable storage medium storing program instructions executable via one or more processors to perform operations comprising:
determining a banding direction in a pattern, wherein the pattern exhibits a gradual change in a color characteristic in the banding direction, the pattern including an edge between a first band of a first color and a second band of a second color;
identifying the edge in the pattern;
rendering a view including a depiction of the pattern, wherein the depiction of the pattern is generated, based on identifying the edge, by adjusting color to replace at least a portion of the edge with a region in which the first color and the second color alternate to form an interleaved portion along where the edge was and having teeth portions, each of the teeth portions having a width of one or more pixels and each of the teeth portions having a length determined based on approximating an angle over which a color grade occurs; and
providing the rendered view on a display.

* * * * *